(12) United States Patent
Eijsbouts et al.

(10) Patent No.: US 7,608,558 B2
(45) Date of Patent: Oct. 27, 2009

(54) HYDROTREATING CATALYST CONTAINING A GROUP V METAL

(76) Inventors: Sonja Eijsbouts, Goudenregenstraat 1, NL-5253 BE Nieuwkuijk (NL); Stuart Leon Soled, 21 Cooks Cross Rd., Pittstown, NJ (US) 08867; Sabato Miseo, 770 County Road 579, Pittstown, NJ (US) 08867

( * ) Notice: Subject to any disclaimer, the term of this patent is extended or adjusted under 35 U.S.C. 154(b) by 260 days.

(21) Appl. No.: 11/579,391

(22) PCT Filed: Apr. 19, 2005

(86) PCT No.: PCT/EP2005/004265

§ 371 (c)(1),
(2), (4) Date: Mar. 7, 2007

(87) PCT Pub. No.: WO2005/103206

PCT Pub. Date: Nov. 3, 2005

(65) Prior Publication Data

US 2007/0227949 A1    Oct. 4, 2007

Related U.S. Application Data

(60) Provisional application No. 60/564,409, filed on Apr. 22, 2004.

(30) Foreign Application Priority Data

Jul. 9, 2004    (EP)    .................................. 04076994

(51) Int. Cl.
C10G 45/08    (2006.01)
B01J 23/887    (2006.01)

(52) U.S. Cl. ....................... 502/222; 502/221; 502/353; 208/216 R; 208/217; 208/249

(58) Field of Classification Search ............. 208/208 R, 208/215, 216 R, 217, 249; 502/311, 312, 502/221–222, 353
See application file for complete search history.

(56) References Cited

U.S. PATENT DOCUMENTS

| 2,946,738 | A |   | 7/1960 | Gardner et al. |
| 3,720,602 | A |   | 3/1973 | Riley et al. |
| 4,414,102 | A |   | 11/1983 | Rankel et al. |
| 5,275,994 | A | * | 1/1994 | Weissman et al. ........... 502/171 |
| 6,231,750 | B1 | * | 5/2001 | Kasztelan et al. ...... 208/111.01 |

FOREIGN PATENT DOCUMENTS

EP    1 029 592 A1    8/2000

OTHER PUBLICATIONS

Gaborit, V. et al (2000). Catalysis Today, 57, 267-273.*

* cited by examiner

Primary Examiner—Robert J Hill, Jr.
Assistant Examiner—Brian McCaig
(74) Attorney, Agent, or Firm—Jeremy J. Kliebert; Marcy M. Hoefling; James A. Jubinsky

(57) ABSTRACT

The present invention pertains to a sulfur-containing catalyst composition suitable for the hydrotreating of hydro-carbon feeds which comprises a Group VIB metal component selected from molybdenum, tungsten, and mixtures thereof, a Group V metal component selected from vanadium, niobium, tantalum, and mixtures thereof, and a Group VIII metal component selected from nickel, cobalt, iron, and mixtures thereof, the metal components (calculated as oxides) making up at least 50 wt. % of the catalyst, wherein the molar ratio between the metal components satisfies the following formula: (Group VIB+Group V):(Group VIII)=0.5-2:1. This catalyst has been found to show a high activity in sulfur removal in combination with good aromatics removal properties.

7 Claims, 1 Drawing Sheet

HYDROTREATING CATALYST CONTAINING A GROUP V METAL

Figure 1:
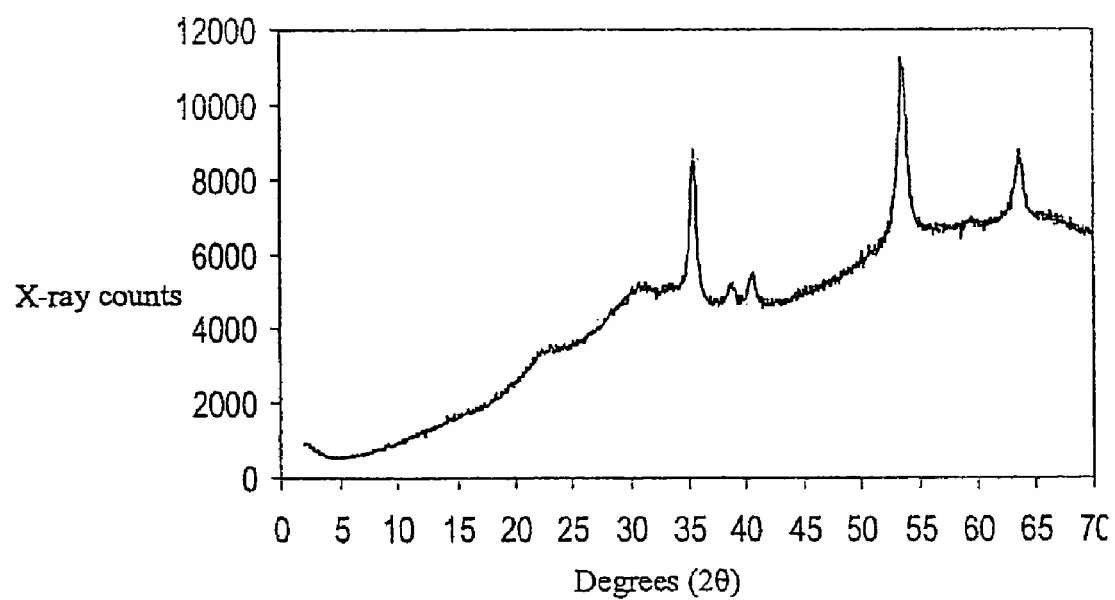

This application claims benefit under Title 35, United States Code, Section 120, to the 60/564409 provisional application filed Apr. 22, 2004. This application further claims foreign priority benefits under Title 35, United States Code, Section 119 to the EP 04076994.5 application filed Jul. 9, 2004.

The present invention pertains to a catalyst suitable for the hydrotreating of hydrocarbon feeds, which contains a Group VIB metal component, a Group VIII metal component, and a Group V metal component. The invention also pertains to a process for preparing such catalyst, and to its use in hydrotreating.

In general, the object of catalytically hydrotreating hydrocarbon-containing feeds is the removal of impurities. Common impurities are sulfur compounds and nitrogen compounds. The at least partial removal of such impurities from a feed will ensure that, when the final product is burnt, fewer sulfur oxides and/or nitrogen oxides, harmful to the environment, will be released. In addition, sulfur compounds and nitrogen compounds are toxic to many of the catalysts employed in the oil industry for converting feeds into ready-for-use products. Examples of such catalysts include cracking catalysts, hydrocracking catalysts, and reforming catalysts. It is therefore customary for feeds to be subjected to a catalytic hydrotreatment prior to their being processed in, say, a cracking unit. Catalytic hydrotreatment implies contacting a feed with hydrogen at elevated temperature and pressure in the presence of a hydrotreating catalyst. In this process the sulfur compounds and nitrogen compounds present in the feed are converted into readily removable hydrogen sulfide and ammonia.

Because the requirements with respect to the legally permitted sulfur and nitrogen contents in fuels are becoming ever stricter, there is a continuous need for hydrotreating catalysts with improved activity. Further, at a given final sulfur content a more active catalyst will make it possible to operate under milder process conditions (energy saving) or to increase the life-span of a catalyst between regenerations (cycle length).

U.S. Pat. No. 5,275,994 describes a sulphur containing catalyst composition suitable for hydrotreating of hydrocarbon feeds and which comprises a Group VIII metal component, a Group VIB metal component and a Group V metal component. This tri-metallic catalyst is necessarily supported on silica or alumina and is preferably characterized as comprising less than 28 wt % of the metal components (calculated as oxides). In the preparation of the catalyst the Group V metal component is necessarily added as an alkoxide in a water-free environment and the catalyst as a whole is preferably calcined at a temperature of at least 500° C. Normatively, the activity of these catalysts in tests using liquid straight-run gas oil has been shown to be low.

U.S. Pat. No. 6,071,402 describes a catalyst for the hydrotreating of hydrocarbon feeds which contains mixed sulfides of a Group VIB metal component, a Group V metal component, and optionally a Group VIII metal component. This publication describes massive catalysts comprising 0.01-100% preferably 0.05% to 100%, more preferably 0.1% to 100%, of at least one mixed sulfide, the catalyst possibly further containing 0 to 99.99%, preferably 0 to 99.95%, more preferably 0 to 99.9%, of at least one group VIII metal. The preferred supported catalyst of this reference generally comprises, in % by weight with respect to the total catalyst mass, 1% to 99.9%, preferably 5% to 99.5%, more preferably 10% to 99%, of at least one matrix material, 0.1% to 99%, preferably 0.5% to 95%, more preferably 1% to 90%, of at least one mixed sulfide of at least one group VB metal and at least one group VIB metal, the catalyst possibly further containing 0 to 30%, preferably 0 to 25%, more preferably 0 to 20%, of at least one group VIII metal. If a Group VIII metal component is present at all in the catalysts of this reference, it is present in limited amounts. More in particular, in Example 7 a catalyst is prepared which contains 0.070 mole of molybdenum, 0.029 mole of niobium, and 0.029 mole of nickel per 100 grams of catalyst. This catalyst has a Mo:Nb:Ni ratio of 2.4:1:1. In the other examples, the amount of Group VIII metal component in relation to the amount of Group VIB and Group V metal components is even lower.

Although the catalysts described in this reference appear to perform acceptably in the hydrotreating of hydrocarbon feeds, there is still a need for a catalyst with improved activity in the hydrodesulfurisation, hydrodenitrogenation, and aromatics hydrogenation of hydrocarbon feeds. In particular there is need for a catalyst that combines a high hydrodesulfurisation activity with a high activity in aromatics conversion.

We have now found that if the Group VIII metal component makes up a specified amount of the total metal components present in the catalyst, a catalyst is obtained with an increased activity.

The present invention thus pertains to a sulfur-containing catalyst suitable for the hydrotreating of hydrocarbon feeds which comprises a Group VIB metal component selected from molybdenum, tungsten, and mixtures thereof, a Group V metal component selected from vanadium, niobium, tantalum, and mixtures thereof, and a Group VIII metal component selected from nickel, cobalt, iron, and mixtures thereof, the metal components (calculated as oxides) making up at least 50 wt. % of the catalyst, wherein the molar ratio between the metal components satisfies the following formula:

(Group VIB+Group V):(Group VIII)=0.35-2:1.

The indications Group V, Group VIB and Group VIII used in the present specification correspond to the Periodic Table of Elements applied by Chemical Abstract Services (CAS system).

It is preferred that molybdenum and/or tungsten make up at least 50 mole % of the total of Group VIB metals, more preferably at least 70 mole %, still more preferably at least 90 mole %. It may be especially preferred for the Group VIB metal to consist essentially of molybdenum and/or tungsten.

It is preferred that niobium and/or vanadium make up at least 50 mole % of the total of Group V metals, more preferably at least 70 mole %, still more preferably at least 90 mole %. It may be especially preferred for the Group V metal to consist essentially of niobium and/or vanadium.

It is preferred that nickel and/or cobalt make up at least 50 mole % of the total of Group VIII non-noble metals, more preferably at least 70 mole %, still more preferably at least 90 mole %. It may be especially preferred for the Group VIII non-noble metal to consist essentially of nickel and/or cobalt. The use of nickel alone as Group VIII metal component is particularly preferred.

Preferred catalyst compositions according to the invention include a catalyst composition wherein the metals components consist essentially of molybdenum, nickel, and vanadium, a catalyst composition wherein the metal components consist essentially of molybdenum, nickel, and niobium, a catalyst composition wherein the metals components consist essentially of tungsten, nickel, and vanadium, and a catalyst composition wherein the metal components consist essentially of tungsten, nickel, and niobium.

FIG. 1 shows a powder X-ray diffraction (hereinafter XRD) pattern for a catalyst prepared in accordance with the invention.

In the context of the present specification the wording "consists essentially of" and "consisting essentially of" mean that the composition in question contains the cited components, but may contain contaminant metals the presence of which cannot reasonably be avoided.

The molar ratio between the metal components in the catalyst according to the invention satisfies the formula (Group VIB+Group V):(Group VIII)=0.35-2:1. Preferably the ratio between the total molar amount of Group VIB and Group V metal and the molar amount of Group VIII metal is at least 0.5:1, more preferably at least 0.6:1, and still more preferably at least 0.75:1. The ratio between the total molar amount of Group VIB and Group V metal and the molar amount of Group VIII metal is preferably at most 1.5:1. If the total molar amount of Group VIB and Group V metal is too high in relation to the molar amount of Group VIII metal, the activity of the catalyst will be insufficient. If the total molar amount of Group VIB and Group V metal is too low in relation to the molar amount of Group VIII metal, or, in other words, the amount of Group VIII metal component is too high, the performance of the catalyst will also be inadequate. Operation within the most preferred ranges gives catalysts with a higher activity than catalysts with a composition within the less preferred ranges.

The molar ratio of Group VIB metals to Group V non-noble metals in the catalyst of the invention generally ranges from 10:1-1:10 and preferably from 3:1-1:3.

The catalyst composition comprises at least 50 wt. % of the total of Group VIB, Group V, and Group VIII metal components, calculated as oxides based on the total weight of the catalyst composition, preferably, at least 70 wt. %, more preferably at least 80 wt. %, still more preferably at least 90 wt. %, calculated as oxides. In the above the Group VIB metals are calculated as trioxides, the Group VIII metals are calculated as mono-oxides, and the Group V metals are calculated as pentoxides (for example $Nb_2O_5$ and $V_2O_5$). The amount of Group VIB metals, Group V metals, and Group VIII non-noble metals can be determined via AAS or ICP on the catalyst after calcination in air at 500° C.

In addition to the metal components discussed above, the catalyst composition according to the invention may also comprise conventional catalyst components like binders or carrier materials, cracking components, conventional hydroprocessing catalysts, etc.

Examples of suitable binders and carrier materials are silica, silica-alumina, alumina, titania, titania-alumina, zirconia, boria, cationic clays or anionic clays such as saponite, bentonite, kaolin, sepiolite or hydrotalcite, and mixtures thereof. Preferred components are silica, silica-alumina, alumina, titania, titania-alumina, zirconia, bentonite, boria, and mixtures thereof, with silica, silica-alumina, and alumina being especially preferred.

Examples of suitable cracking components are crystalline cracking components such as zeolites, e.g., ZSM-5, (ultrastable) zeolite Y, zeolite X, ALPOs, SAPOs, MCM-41, amorphous cracking components such as silica-alumina, and mixtures thereof. It will be clear that some materials, e.g., silica-alumina, may act as binder and cracking component at the same time.

If so desired, the catalyst composition may comprise any further materials such as phosphorus-containing compounds, boron-containing compounds, silicon-containing compounds, fluorine-containing compounds, additional transition metals, rare earth metals, or mixtures thereof.

The catalyst composition may have many different shapes. Suitable shapes include powders, spheres, cylinders, rings, and symmetric or asymmetric polylobes, for instance tri- and quadrulobes. Particles resulting from extrusion, beading or pelleting usually have a diameter in the range of 0.2 to 10 mm, and their length likewise is in the range of 0.5 to 20 mm. These particles are generally preferred. Powders, including those resulting from, e.g., spray-drying generally have a median particle diameter in the range of 1 μm-100 μm, but deviations from this general range are possible.

The catalyst according to the invention is a sulfur-containing catalyst. The sulfur may be present in the catalyst in whole or in part in the form of metal sulfides. It may also be present in whole or in part in the form of a sulfur compound not bound to the metal components. In this case, the sulfur will be converted into metal sulfides during use of the catalyst in hydrotreating or during a preceding reduction/activation step in the presence of hydrogen. The sulfur content of the catalyst is generally at least 8 wt. %, more preferably at least 15 wt. %, still more preferably at least 20 wt. %. The sulfur content of the catalyst is generally at most 70 wt. %, preferably at most 60 wt. %, depending on the composition.

The total amount of sulfur present in the catalyst according to the invention is generally selected to correspond to 70-200%, more preferably 80-150%, of the stoichiometric sulfur quantity necessary to convert the hydrogenation metals into, $MoS_2$, $WS_2$, $CrS$, $Co_9S_8$, $Ni_3S_2$, $FeS$, $NbS_2$, $VS$, and $TaS_2$ respectively.

As will be evident to the skilled person, when the catalyst according to the invention is used in the hydroprocessing of hydrocarbon feeds, the metal components will be present in the sulfided form. A preferred embodiment of the present invention is therefore a catalyst wherein at least part of the metal components are present in the sulfided form. In this case, it is preferred for the catalyst to be essentially free from Group VIII non-noble metal disulfides. The Group VIII non-noble metals are preferably present as (Group VIII non-noble metal)$_a$S$_b$ with a/b being in the range of 0.5-1.5, as can be determined by, e.g., XRD. Molybdenum and tungsten are preferably at least partly present in the sulfided catalyst as disulfides, as can be determined by, e.g., XRD. Chromium, if present, is preferably at least partly present as sulfide (CrS or $Cr_2S_3$), as can be determined by, e.g., XRD. The Group V metal component is preferably at least partly present as $NbS_2$, $V_2S5$, and $TaS_2$, respectively.

As indicated above, the sulfur in the sulfur-containing catalyst according to the invention may also be present in whole or in part in the form of a sulfur compound not bound to the metal components. It may, e.g., be present in the form of elemental sulfur, in the form of organic sulfur compounds, or in the form of inorganic sulfur compounds that are not sulfides of the metals of Group VI, Group V, and Group VIII metal components. In this case, the sulfur-containing catalyst may be subjected to an activation step to convert the metal components at least partly into their sulfides. The activation step generally comprises contacting the catalyst with hydrogen at a temperature of 100-600° C. for an adequate period of time. Such an activation step can be carried out ex situ, that is, outside the hydroprocessing unit in which the catalyst will be used, or in situ, that is, in the hydroprocessing unit in which the catalyst will be used.

Various groups of sulfur compounds which may be present in the sulfur-containing catalyst wherein the sulfur is not yet bound to the metal compound in the form of a metal sulfide according to the invention will be exemplified below.

Preferred sulfur compounds include organic compounds having at least one mercapto-group. Within the group of mercapto-compounds, mercaptocarboxylic acids represented by the general formula HS—R1-COOR, wherein R1 stands for a divalent hydrocarbon group with 1-10 carbon atoms and R stands for a hydrogen atom, an alkali atom, an alkaline earth metal, ammonium, or a linear or branched alkylgroup having 1 to 10 carbon atoms. Examples include mercaptoacetic acid (HS—CH2-COOH), beta-mercaptoprioprionic acid (HS—CH2CH2-COOH), methylmercaptoacetate (HS—CH2-COOCH3), ethyl 2-mercaptoacetate (HS—CH2-COOC2H5), ethylhexyl mercaptoacetate (HS—CH2-COOC8H17), and methyl 3-mercaptoproprionate ((HS—CH2CH2-COOCH3).

Further compounds preferred within the group of mercapto-compounds include aminosubstituted mercaptanes represented by the general formula H2N—R2-SH, wherein R2 stands for a divalent hydrocarbon group having 1-15 carbon atoms. Examples of these compounds include 2-amino ethanethiol (H2N—CH2CH2-SH), and 4-amino thiophenol (H2N—C6H4-SH).

Additional compounds within the group of mercapto-compounds are the di-mercaptanes represented by the general formula HS—R3-SH, wherein R3 stands for a divalent hydrocarbon group having 1-15 carbon atoms. Examples of these compounds include ethanedithiol (HS—CH2CH2-SH) and 1,4-butanedithiol (HS—(CH2)4-SH).

Preferred compounds also include thioacids of the formula R4-COSH, wherein R4 stands for a monovalent hydrocarbon group having 1-15 carbon atoms. Examples of these compounds include thioacetic acid (CH3-COSH) and thiobenzoic acid (C6H5COSH). Dithioacids of the formula HSOC—R5-COSH, wherein R5 is a divalent hydrocarbon group with 1-15 carbon atoms may also be suitable. An example is dithioadipic acid (HSOC—C4H10-COSH).

Preferred compounds also include mercaptoalcohols of the general formula $R6S—R5-(OH)_n$, wherein R5 represents an alkyl group having from 1 to 15 carbon atoms or a phenyl group, R6 represents a hydrogen atom or an alkyl group having 1 or 2 carbon atoms, and n is 1 or 2. Examples of these compounds include 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2,-propanediol, 3-methylthio-1,2, propanediol, and 3-ethylthio-1,2, propanediol.

Other suitable compounds include sulfoxides of the formula R7-SO—R8, wherein R7 and R8 are hydrocarbon groups with 1-5 carbon atoms. An example is dimethyl sulfoxide (CH3-SO—CH3).

Ammonium thiocyanate and thiourea may also be useful compounds, as may be the various dithiocarbamic acids and the salts thereof, such as ethylene bisdithiocarbamic acid and its salts, and dimethyl dithiocarbamic acid and its salts. Other suitable compounds include mercaptodiathiazoles and their salts, such as 2,5-dimercapto-1,3,4,-diathiazoles and its salts.

Other compounds that may be useful are polysulfides of the formula R9-Sx-R10, wherein x is a value of 1-15 and R9 and R10 are alkyl groups, preferably branched alkyl groups, with 1-30 carbon atoms. Related compounds are those with the formula HO—R11-Sx-R12-OH, wherein x is a value of 1-15 and R11 and R12 are alkyl groups with 1-8 carbon atoms.

Additional sulfur compounds include elemental sulfur and inorganic sulfur compounds like $(NH_4)_2S_x$.

The present invention also pertains to a process for preparing the catalyst composition of the present invention, which comprises combining, sequentially, or simultaneously, a component of a Group VIB metal selected from molybdenum, tungsten, and mixtures thereof, a component of a Group V metal selected from vanadium, niobium, tantalum, and mixtures thereof, a component of a Group VIII metal selected from nickel, cobalt, iron, and mixtures thereof, and a sulfur compound.

It is possible to combine all these components in a single step. It is also possible to combine the sulfur compound with one or more of the metal compounds and then combine the resulting product with the other metal compounds. However, sulfide-containing materials must be handled in an inert atmosphere to prevent oxidation. Therefore in a preferred embodiment of the process of present invention in a first step a component of a Group VIB metal, a component of a Group V metal, and a component of a Group VIII metal are combined to form an oxygen-stable product followed by combining the oxygen-stable product with a sulfur compound.

There are various ways in which a component of a Group VIB metal, a component of a Group V metal, and a component of a Group VIII metal may be combined.

In a first process, the metal components are combined and reacted in the presence of a protic liquid, after which the resulting composition is isolated and dried. Any protic liquid that does not interfere with the reaction may be used. Suitable liquids include water, carboxylic acids, lower alcohols such as ethanol and propanol and mixtures thereof. The use of water is preferred.

The at least three metal components used in the process according to the invention, namely at least one Group VIII metal component, at least one Group VIB metal component and at least one Group V metal component may be in the solute state or at least partly in the solid state during the process of the invention. Thus, the reaction may involve three solute components, two solute components and one at least partly solid component, one solute component and two at least partly solid components, and three at least partly solid components. The reaction may involve precipitation and, depending on the state of the various components, also dissolution and re-precipitation.

Generally, there are two possible ways of contacting the metal components with one another, namely by combining and reacting the metal components in solution to form a precipitate (hereinafter designated as the "solution route"), or by combining and reacting the metal components in the presence of a protic liquid with at least one of the metal components remaining at least partly in the solid state (hereinafter designated as the "solid route").

In the solution route, the metal components are completely dissolved when they are combined and/or reacted to form a precipitate. It is possible, e.g., to combine the metal components when they are already in the dissolved state and then have them react to form a precipitate. However, it is also possible to combine one or more of the metal components that are partly or entirely in the solid state with further metal components while ensuring that the metal components which are partly or entirely in the solid state will dissolve when present in the reaction mixture. In other words, at least once during the solution route process, all metal components must be present wholly as a solution.

Precipitation can be effected by, e.g., (a) changing the pH during or after combination of the metal component solutions to such a value that precipitation is induced;

(b) adding a complexing agent during or after combination of the metal component solutions, which complexing agent forms a complex with one or more of the metals to prevent precipitation of the metals, and thereafter changing the reaction conditions, such as temperature or pH, such that the complexing agent releases the metals for precipitation;

(c) adjusting the temperature during or after combination of the metal component solutions to such a value that precipitation is induced;
(d) lowering the amount of solvent during or after combination of the metal component solutions such that precipitation is induced;
(e) adding a non-solvent during or after combination of the metal component solutions to induce precipitation thereof, with a non-solvent, meaning that the precipitate is essentially insoluble in this solvent;
(f) adding an excess of either of the components to such an extent that precipitation is induced.

Adjusting the pH in, e.g., option (a) or (b) can be done by adding a base or an acid to the reaction mixture. However, it is also possible to add compounds which upon the temperature increasing will decompose into hydroxide ions or $H^+$ ions, which increase and decrease the pH, respectively. Examples of compounds which will decompose upon the temperature increasing and thereby increase or decrease the pH are urea, nitrites, ammonium cyanate, ammonium hydroxide, and ammonium carbonate.

The solid route comprises combining and reacting the metal components, with at least one of the metal components remaining at least partly in the solid state. More in particular, it comprises adding the metal components to one another and simultaneously and/or thereafter reacting them. Consequently, in the solid route at least one metal component is added at least partly in the solid state and this metal component remains at least partly in the solid state during the entire reaction. The term "at least partly in the solid state" in this context means that at least part of the metal component is present as a solid metal component and, optionally, another part of the metal component is present as a solution in the protic liquid. A typical example of this is a suspension of a metal component in a protic liquid, where the metal is at least partly present as a solid, and optionally partly dissolved in the protic liquid.

It is possible to first prepare a suspension of a metal component in the protic liquid and to add, simultaneously or successively, solution(s) and/or further suspension(s) comprising metal component(s) dissolved and/or suspended in the protic liquid. It is also possible to first combine solutions either simultaneously or successively and to subsequently add further suspension(s) and optionally solution(s) either simultaneously or successively.

As long as at least one metal component is at least partly in the solid state during the solid route, the number of metal components which are at least partly in the solid state is not critical. Thus it is possible for all metal components to be combined in the solid route to be applied at least partly in the solid state. Alternatively, a metal component which is at least partly in solid state can be combined with a metal component which is in the solute state. E.g., one of the metal components is added at least partly in the solid state and, e.g., at least two and preferably two metal components are added in the solute state. In another embodiment, e.g., two metal components are added at least partly in the solid state and at least one and preferably one metal component is added in the solute state.

That a metal component is added "in the solute state" means that the whole amount of this metal component is added as a solution in the protic liquid.

As will be clear from the above, it is possible to add the Group VIII metal component, the Group V metal component, and the Group VIB metal component in various ways: at various temperatures and pHs, in solution, in suspension, wetted or as such, simultaneously or sequentially. It should be noted that it is preferred not to employ sulfide-containing metal components during the combining of the metal components, as these components and the resulting products are not stable in the presence of oxygen, which implies that all process steps subsequent to the addition of this metal component, even those at a lower temperature, will have to be carried out under an inert atmosphere if resulfing of the material is to be avoided.

Suitable water-soluble Group VIII metal components to be used in the process of the invention include salts, such as nitrates, hydrated nitrates, chlorides, hydrated chlorides, sulfates, hydrated sulfates, formates, acetates, or hypophosphite. Suitable water-soluble nickel and cobalt components include nitrates, sulfates, acetates, chlorides, formates or mixtures thereof as well as nickel hypophosphite. Suitable water-soluble iron components include iron acetate, chloride, formate, nitrate, sulfate or mixtures thereof.

Suitable water-soluble Group VIB metal components include Group VIB metal salts such as ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable water-soluble isopoly- and heteropoly compounds are given in *Molybdenum Chemicals*, Chemical data series, Bulletin Cdb-14, Feb. 1969 and in *Molybdenum Chemicals*, Chemical data series, Bulletin Cdb-12a-revised, November 1969. Suitable water-soluble chromium compounds include chromates, isopolychromates and ammonium chromium sulfate.

Suitable water-soluble Group V metal components to be used in the process of the invention include water-soluble salts and acids such as vanadium sulfate, vanadium heteropolyacids, niobic acid, NbOCl3, and tantalic acid.

If the protic liquid is water, suitable Group VIII metal components which are at least partly in the solid state during the process of the invention comprise Group VIII metal components with a low solubility in water such as citrates, oxalates, carbonates, hydroxy-carbonates, hydroxides, phosphates, phosphides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred, with hydroxy-carbonates and carbonates being most preferred. Generally, the molar ratio between the hydroxy groups and the carbonate groups in the hydroxy-carbonate lies in the range of 0-4, preferably 0-2, more preferably 0-1 and most preferably 0.1-0.8.

If the protic liquid is water, suitable Group VIB metal components which are at least partly in the solid state during contacting comprise Group VIB metal components with a low solubility in water, such as di- and trioxides, carbides, nitrides, aluminium salts, acids, or mixtures thereof. Preferred Group VIB metal components which are at least partly in the solid state during contacting are di- and trioxides, acids, and mixtures thereof. Suitable molybdenum components include molybdenum di- and trioxide, molybdenum carbide, molybdenum nitride, aluminium molybdate, molybdic acids (e.g. $H_2MoO_4$), ammonium phosphomolybdate, or mixtures thereof, with molybdic acid and molybdenum di- and trioxide being preferred. Suitable tungsten components include tungsten di- and trioxide, tungsten carbide, ortho-tungstic acid ($H_2WO_4 \cdot H_2O$), tungsten nitride, aluminium tungstate (also meta- or polytungstate), ammonium phosphotungstate, or mixtures thereof, with ortho-tungstic acid and tungsten di- and trioxide being preferred.

If the protic liquid is water, suitable Group V metal components which are at least partly in the solid state during the process of the invention comprise Group V metal components with a low solubility in water such as oxides, silicides, phosphides, and borides.

It is well within the scope of the skilled person to select suitable soluble or insoluble compounds, as the case may require.

In the context of the present specification, the material which will be at least partly in the solid state during the entire process has a solubility of less than 0.05 mol/100 ml solvent (18° C.).

If so desired, a material selected from the group of binder materials, conventional hydroprocessing catalysts, cracking components, or mixtures thereof can be added prior to, during the combining and reacting of the metal components and/or subsequent thereto. These materials will be designated as "carrier materials" below.

The carrier material can be added prior to the contacting of the metal components by, e.g., combining it with one or more but not all of the metal components or vice versa, and by subsequently combining the mixture with the not yet added metal components either simultaneously or successively. The carrier material can be added during the contacting of the metal components by, e.g., simultaneously combining the carrier material and the metal components or first combining the metal components either simultaneously or successively and then adding the carrier material during the reaction of the combined metal components. The carrier material can be added subsequent to the contacting of the metal components by, e.g., adding it directly to the reaction mixture obtained after the reaction of the metal components or by adding it after any of the further process steps which will be discussed in detail below. Preferably, the carrier material is added subsequent to the contacting of the metal components. Optionally, the catalyst composition resulting after combining and reacting the metal components can be subjected to a solid-liquid separation before being composited with the carrier materials, e.g., filtration. After solid-liquid separation, a washing step may be carried out. Further, it is possible to thermally treat the catalyst composition prior to its being composited with the carrier materials. The carrier materials can be added in any suitable form, e.g., in the dry state, either thermally treated or not, in the wetted and/or suspended state, as a filter cake, and/or as a solution.

Optionally, the process of the present invention may comprise the further process steps of spray-drying, (flash) drying, milling, kneading, slurry-mixing, dry or wet mixing, shaping, and/or calcining. Dry mixing means mixing the catalyst composition in the dry state with any of the above materials in the dry state. Wet mixing, e.g., comprises mixing the wet filter cake comprising the catalyst composition and optionally any of the above materials as powders or wet filter cake to form a homogenous paste thereof. Shaping comprises, e.g., extrusion, pelletizing, beading and/or spray-drying.

It is generally preferred for the process according to the invention to comprise a shaping step. The shaping step is preferably carried out after the combining and reacting of the metal components. If a carrier material is to be added in the process according to the invention, it is preferably added before the shaping step is carried out.

If so desired, the product resulting from the combining of the Group VIII metal component, the Group VIB metal component, and the Group V metal component may be submitted to a calcination step. This calcination step, if applied, will generally be carried out at a temperature of 100-600° C., more in particular 150-400° C., still more in particular 250-350° C.

The calcination time generally varies from 0.5 to 48 hours. The calcination may be carried out in an inert gas such as nitrogen, or in an oxygen-containing gas, such as air or pure oxygen, optionally in the presence of steam. Preferably, the calcination is carried out in an oxygen-containing atmosphere.

As indicated above, it is preferred that sulfur is incorporated into the catalyst composition after combining the various metal components to form a product. There are various ways to do this. It is, e.g., possible to contact the catalyst with one or more of the sulfur compounds described above, e.g., by contacting the product with a sulfur-containing liquid. Such liquid may be the liquid form of a sulfur component. It may also be a solution of a sulfur compound. For elemental sulfur it is possible to incorporate the sulfur into the catalyst via melting or sublimation. It is also possible to sulfide the product in the gaseous phase by contacting it with a sulfur-containing gas like $H_2S$. Finally, it is also possible to sulfide the catalyst by contacting it with a sulfur-containing hydrocarbon feed, e.g., a hydrocarbon feed that has been spiked with a sulfur-containing compound such as dimethyidisulfide (DMDS). Depending on the method used, the contacting the catalyst with a sulfur-containing compound can be carried out in situ and/or ex situ. Contacting the product with a gaseous sulfur component such as $H_2S$ can be done ex situ or in situ. Contacting the product with a sulfur-containing hydrocarbon feed is preferably done in situ. Contacting the catalyst with elemental sulfur or with a liquid or dissolved sulfur compound as described above will generally be done ex situ. In this case it may be desired however, to subject the sulfur-containing material to an activation step with hydrogen as described above. The activation with hydrogen can be done ex situ or in situ.

In the context of the present specification the indication in situ refers to a process carried out in the unit in which the catalyst will be eventually used in the hydroprocessing of hydrocarbon feeds. Conversely, ex situ refers to a process carried out not inside such unit.

Two preferred embodiments of the preparation process according to the invention will be elucidated below.

A first embodiment is a process comprising the successive steps of combining the metal components in a protic liquid, optionally mixing the resulting product with a carrier material, shaping the resulting composition, e.g., by spray-drying or extrusion, optionally calcining the resulting composition, and combining the resulting product with a sulfur-containing compound. A more preferred version of this embodiment comprises the steps of combining and reacting the metal components in a protic liquid, isolating the reaction product, optionally mixing the resulting catalyst composition with a carrier material, shaping the resulting composition, e.g., by spray-drying or extrusion, calcining the resulting composition, and sulfiding the resulting material.

Use According to the Invention

The catalyst composition according to the invention can be used in virtually all hydroprocessing processes to treat a plurality of feeds under wide-ranging reaction conditions, e.g., at temperatures in the range of 200° to 450° C., hydrogen pressures in the range of 5 to 300 bar, and space velocities (LHSV) in the range of 0.05 to 10 $h^{-1}$. The term "hydroprocessing" in this context encompasses all processes in which a hydrocarbon feed is reacted with hydrogen at elevated temperature and elevated pressure, including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulfurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of 250°-450° C., pressures in the range of 5-250 bar, space velocities in the range of 0.1-10 h$^{-1}$, and H$_2$/oil ratios in the range of 50-2000 Nl/l.

The present invention will be elucidated by the following examples, without being limited thereto or thereby.

EXAMPLE 1

Preparation of a Catalyst Containing Molybdenum, Vanadium and Nickel

A catalyst composition was prepared as follows. 78 grams of nickel hydroxy-carbonate, 31 grams of MoO$_3$ and 21 grams of vanadium pentoxide were combined in an aqueous medium. The slurry was aged overnight at 90° C. under stirring. The resulting suspension was filtered and the wet filter cake mixed. During the mixing, the temperature was increased somewhat to reduce the water content of the mixture to obtain an extrudable mix. The mixture was then extruded, and the extrudates were dried at 120° C. and calcined at 300° C. The resulting material contained 27.3 wt. % of molybdenum, calculated as trioxide, 20.4 wt. % of vanadium, calculated as vanadium pentoxide, and 52.2 wt. % of nickel, calculated as oxide. The Mo:V:Ni molar ratio in the end product was 0.27:0.33:1.

EXAMPLE 2

Preparation of a Catalyst Containing Tungsten, Vanadium, and Nickel

A catalyst composition was prepared from 65 grams of nickel hydroxy-carbonate, 18 grams of vanadium pentoxide, and 45 grams of tungstic acid in a manner analogous to that described in Example 1 above. The resulting material contained 29 wt. % of tungsten, calculated as trioxide, 18.4 wt. % of vanadium, calculated as vanadium pentoxide, and 50.9 wt. % of nickel, calculated as oxide. The W:V:Ni molar ratio in the end product is 0.18:0.30:1.

EXAMPLE 3

Preparation of a Catalyst Containing Molybdenum, Niobium and Nickel

A catalyst composition was prepared from 72 grams of nickel hydroxy-carbonate, 32 grams of Nb$_2$O$_5$.3H$_2$O, and 29 grams of molybdenum trioxide in a manner analogous to that described in Example 1 above. The resulting material contained 29.8 wt. % of molybdenum, calculated as trioxide, 26.0 wt. % of niobium, calculated as niobium pentoxide, and 45 wt. % of nickel, calculated as oxide. The Mo:Nb:Ni molar ratio in the end product was 0.34:0.33:1.

EXAMPLE 4

Preparation of a Catalyst Containing Tungsten, Niobium, and Nickel

A catalyst composition was prepared from 61 grams of nickel hydroxy-carbonate, 27 grams of Nb$_2$O$_5$.3H$_2$O, and 42 grams of tungstic acid in a manner analogous to that described in Example 1 above. The resulting material contained 39.5 wt. % of tungsten, calculated as trioxide, 22.6 wt. % of niobium, calculated as niobium pentoxide, and 38.7 wt. % of nickel, calculated as oxide. The W:Nb:Ni molar ratio in the end product was 0.32:0.33:1.

EXAMPLE 5

Testing

The catalysts were tested in an upflow tubular reactor. Each reactor tube contained 10 ml of catalyst mixed with an equal amount of SiC particles and sandwiched between layers of SiC particles.

Before being tested the catalysts were presulfided via liquid phase presulfiding using the feed described below which had been spiked with dimethyl disulfide to a total sulfur content of 3.7 wt. %. The presulfided catalysts were then tested in the hydrotreating of a diesel feedstock having the properties shown in Table 1:

TABLE 1

| | |
|---|---|
| S (wt. %) | 1.2 |
| N (ppm wt) | 84 |
| Total aromatics (wt. %) | 27.8 |
| Polynuclear aromatic (PNA) (wt. %) | 11.7 |
| Mono-aromatics (wt. %) | 16.5 |
| Di-aromatics (wt. %) | 10.8 |
| Tri+-aromatics (wt. %) | 0.8 |
| Simulated distillation ASTM-D 86 | |
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 2:

TABLE 2

| | Presulfiding | Condition 1 | Condition 2 |
|---|---|---|---|
| Temperature (° C.) | 320 | 330 | 340 |
| Pressure (bar) | 40 | 40 | 20 |
| H2 to oil ratio (Nl/l) | 300 | 300 | 300 |
| WHSV (1/h) | 1.76 | 1.17 | 0.88 |
| LHSV (1/h) | 3.00 | 2.00 | 1.50 |

The test results are given in Table 3 below:

TABLE 3

|  | NiMoV Example 1 | NiWV Example 2 | NiMoNb Example 3 | NiWNb Example 4 |
|---|---|---|---|---|
| Condition 1 | | | | |
| Product S (ppm) | 27 | 31 | 19 | 26 |
| Product N (ppm) | 1.7 | 1.2 | 1.7 | 1.8 |
| Total aromatics (wt. %) | 20.0 | 18.7 | 16.9 | 14.8 |
| Polynuclear aromatic (wt. %) | 0.9 | 1.0 | 0.4 | 0.7 |
| Mono-aromatics (wt. %) | 19.1 | 17.7 | 16.5 | 14.1 |
| Di-aromatics (wt. %) | 0.9 | 1.0 | 0.4 | 0.6 |
| Tri+-aromatics (wt. %) | 0 | 0 | 0 | 0.1 |
| Condition 2 | | | | |
| Product S (ppm) | 563 | 424 | 72 | 72 |
| Product N (ppm) | 17.1 | 16.5 | 2.0 | 4.7 |
| Total aromatics (wt. %) | 26.6 | 26.4 | 25.4 | 24.9 |
| Polynuclear aromatic (wt. %) | 4.2 | 4.3 | 2.1 | 4.0 |
| Mono-aromatics (wt. %) | 22.4 | 22.1 | 23.3 | 20.9 |
| Di-aromatics (wt. %) | 4.0 | 4.1 | 2.0 | 3.6 |
| Tri+-aromatics (wt. %) | 0.2 | 0.2 | 0.1 | 0.4 |

The above results show that the catalysts of this invention are highly active in sulfur and nitrogen removal. Additionally, the decrease in polynuclear aromatics and diaromatics is particularly striking.

EXAMPLES 6 TO 10

Preparation of Catalysts Containing Tungsten, Niobium, and Nickel

Catalyst compositions were prepared from nickel hydroxycarbonate, niobic acid, and tungstic acid in a manner analogous to that described in Example 1 above. Nickel hydroxycarbonate, niobic acid, and tungstic acid were combined in an aqueous medium. The slurry was aged overnight at 90° C. under stirring. The resulting suspension was filtered and the wet filter cake was mixed. During the mixing, the temperature was increased somewhat to reduce the water content of the mixture to obtain an extrudable mix. The mixture was then extruded, and the extrudates were dried at 120° C. and calcined at 300° C.

The composition of the resulting materials and the molar rations of Ni:Nb:W are shown in Table 4 below. Also included in this table are certain physical properties of the catalysts, namely their surface area (SA), pore volume (pV) and median pore diameter (MPD) and wherein BET represents Brunauer, Emmett and Teller, and Ads and Des are adsorption and desorption respectively.

Obviously, a high active surface area will improve the activity of a catalyst but equally high pore volume and pore diameter are prerequisites for high activity.

EXAMPLE 11

Testing

The catalysts were tested in an upflow tubular reactor. Each reactor tube contained 10 ml of catalyst mixed with an equal amount of SiC particles and sandwiched between layers of SiC particles.

Before being tested the catalysts were presulfided via liquid phase presulfiding using the feed described below which had been spiked with dimethyl disulfide to a total sulfur content of 3.7 wt. %. The presulfided catalysts were then tested in the hydrotreating of a diesel feedstock having the properties shown in Table 5:

TABLE 5

|  | GAS OIL FEEDSTOCK |
|---|---|
| Sulphur content (% wt) | 1.23 |
| Nitrogen content (ppm wt) | 85 |
| Mono aromatics (% wt) | 16.6 |
| Di-aromatics (% wt) | 11.1 |
| Di+-aromatics (% wt) | 0.7 |
| Total Aromatics (% wt) | 28.4 |
| Simulated Distillation ASTM-D 86 | |
| Initial Boiling Point | 180 |
| 5% Volume (° C.) | 220 |
| 10% Volume (° C.) | 233 |
| 20% Volume (° C.) | 250 |
| 30% Volume (° C.) | 262 |
| 40% Volume (° C.) | 273 |
| 50% Volume (° C.) | 284 |
| 60% Volume (° C.) | 295 |
| 70% Volume (° C.) | 307 |
| 80% Volume (° C.) | 321 |
| 90% Volume (° C.) | 341 |
| 95% Volume (° C.) | 345 |
| Final Boiling Point (° C.) | 354 |

The catalysts were tested under the two conditions shown in Table 6 that notably are different to those previously employed (and shown in Table 2). A person of ordinary skill in the art would recognize that Table 6 depicts more difficult hydrotreating conditions and would therefore expect lower conversions than previously shown in Table 3.

TABLE 4

| FINAL CATALYST | EXAMPLE 6 (COMPARATIVE) | EXAMPLE 7 | EXAMPLE 8 | EXAMPLE 9 | EXAMPLE 10 (COMPARATIVE) |
|---|---|---|---|---|---|
| $WO_3$ (wt %) | 26.7 | 40.0 | 45.2 | 51.3 | 53.2 |
| NiO (wt % | 55.7 | 37.9 | 28.3 | 18.0 | 13.5 |
| $Nb_2O_5$ (wt %) | 15.6 | 22.7 | 26.3 | 30.5 | 32.8 |
| Molar Ratio Ni:Nb:W | 1:0.16:0.15 | 1:0.34:0.34 | 1:0.52:0.51 | 1:0.95:0.92 | 1:1.36:1.27 |
| $N_2$ - SA-BET ($m^2$/g) | 227 | 148 | 142 | 139 | 111 |
| $N_2$ - PV Ads (ml/g) | 0.34 | 0.23 | 0.21 | 0.18 | 0.13 |
| $N_2$ - PV Des ml/g) | 0.35 | 0.24 | 0.23 | 0.18 | 0.14 |
| $N_2$ - AMPD (nm) | 7.9 | 8.8 | 8.8 | 6.6 | 5.7 |
| $N_2$ - DMPD (nm) | 6.1 | 7.2 | 7.5 | 5.4 | 4.4 |

TABLE 6

|  | Presulfiding | Condition 1 | Condition 2 |
|---|---|---|---|
| Temperature (° C.) | 315 | 315 | 340 |
| Pressure (bar) | 45 | 45 | 20 |
| H2 to oil ratio (Nl/l) | 200 | 200 | 200 |
| LHSV (1/h) | 3.0 | 1.5 | 1.5 |

The test results are given in Table 7 below wherein RWA is relative weight activity, HDN is hydrodenitrogenation and HDS is hydrodesulfurisation.

TABLE 7

|  | EXAMPLE 6 (COMPARATIVE) | EXAMPLE 7 | EXAMPLE 8 | EXAMPLE 9 | EXAMPLE 10 (COMPARATIVE) |
|---|---|---|---|---|---|
| Condition 1 | | | | | |
| Product S (ppm) | 1364 | 655 | 1220 | 1086 | 2672 |
| Conversion % | 88.9 | 94.7 | 90.0 | 91.1 | 78.2 |
| RWA HDS | 168 | 265 | 181 | 195 | 100 |
| Product N (ppm) | 2.1 | 0.5 | 1.6 | 6.4 | 19.0 |
| Conversion % | 97.4 | 99.4 | 98.0 | 92.2 | 76.9 |
| RWA HDN | 249 | 348 | 269 | 174 | 100 |
| Condition 2 | | | | | |
| Product S (ppm) | 703 | 324 | 343 | 120 | 870 |
| Conversion % | 94.3 | 97.4 | 97.2 | 99.0 | 92.9 |
| RWA HDS | 114 | 174 | 169 | 285 | 100 |
| Product N (ppm) | 33 | 17 | 18 | 12 | 33 |
| Conversion % | 59.8 | 78.7 | 77.6 | 85.6 | 60.3 |
| RWA HDN | 99 | 168 | 162 | 210 | 100 |

The results show that the catalysts having compositions inside the claimed range are better than those just outside this range.

EXAMPLE 12

The X-ray diffraction pattern shown in FIG. 1 was derived by scanning a catalyst prepared in accordance with Example 8. The XRD scans were recorded using a standard powder diffractometer with Ni—Kβ filter and Cu—K☐ radiation. The generator settings were 40 kV, 40 mA and utilized the following slits: divergence and anti-scatter slit V20, detector slit 0.6 mm. A measuring range of 2☐=2.0-70.0☐, at a step size of 0.05☐ and at a measuring rate of 2.0 seconds per step was employed.

As can be seen from FIG. 1, five reflections are featured which equate approximately to d=2.6 Å, 2.3 Å, 2.2 Å, 1.7 Å and 1.45 Å. Of these, the reflections at 2.6 and 1.7 Å are the most intense. Compared to XRD patterns. obtained for other examples prepared according to the invention (not shown), the exact location of the reflections is somewhat dependent on the chemical composition; however, the patterns are characterized by the fact that they can be indexed as the (100), (002), (101), (102) and (110) reflections of a hexagonal unit cell with axis lengths of approximately 2.9-3.0 Å and 4.6-4.7 Å.

This is representative of a meta-stable phase with atomic dispersion, which is easy to sulfide and, therefore, catalytically active. The absence of other peaks in the XRD spectrum shows that the raw materials used in the preparation have indeed reacted with each other inside the claimed range.

The invention claimed is:

1. A sulfur-containing catalyst composition suitable for the hydrotreating of hydrocarbon feeds which comprises a Group VIB metal component selected from molybdenum, tungsten, and mixtures thereof, a Group V metal component selected from vanadium, niobium, tantalum, and mixtures thereof, and a Group VIII metal component selected from nickel, cobalt, iron, and mixtures thereof, the metal components (calculated as oxides) making up at least 70 wt % of the catalyst, wherein the molar ratio between the metal components satisfies the following formula:

(Group VIB+Group V):(Group VIII) =0.35-2:1.

2. A catalyst composition according to claim 1 wherein the ratio between the total molar amount of Group VIB and Group V metal and the molar amount of Group VIII metal is at least 0.6:1, preferably at least 0.75:1 and at most 1.5:1.

3. A catalyst composition according to claim 1, wherein metal components make up at least 80 wt. % of the catalyst composition, calculated as oxides, and preferably at least 90 wt. %.

4. A catalyst composition according to claim 1, wherein the vanadium and/or niobium make up at least 50 mole % of the total of Group V metal components, preferably at least 70 mole %, more preferably at least 90 mole %, most preferably substantially all of the Group V metal components.

5. A catalyst composition according to claim 1, wherein cobalt and nickel make up at least 50 mole % of the total of Group VIII metal components, preferably at least 70 mole %, more preferably at least 90 mole %, most preferably substantially all of the Group VIII metal components.

6. A catalyst composition according to claim 5, characterised in that nickel makes up substantially all of the Group VIII metal components.

7. A process for preparing a catalyst composition as defined in claim 1, which comprises combining, sequentially, or simultaneously, a Group VIB metal component selected from molybdenum, tungsten, and mixtures thereof, a Group V metal component, selected from vanadium, niobium, tantalum, and mixtures thereof, a Group VIII metal component selected from nickel, cobalt, iron, or mixtures thereof, and a sulfur compound, wherein the amount of Group VIB, Group V, and Group VIII metal component used is that amount effective at producing a catalyst composition wherein the metal components (calculated as oxides) make up at least 70 wt. % of the catalyst and the molar ratio among said Group VIB, Group V, and Group VIII metal components satisfies the formula:

(Group VIB+Group V):(Group VIII)=0.35-2:1.

* * * * *